(12) United States Patent
Usuki et al.

(10) Patent No.: US 10,392,729 B2
(45) Date of Patent: Aug. 27, 2019

(54) BINDING STRUCTURE OF INDUSTRIAL FABRIC

(71) Applicant: NIPPON FILCON CO., LTD., Inagi-shi, Tokyo (JP)

(72) Inventors: Tsutomu Usuki, Fuji Shizuoka (JP); Fumihito Takahashi, Fuji Shizuoka (JP)

(73) Assignee: NIPPON FILCON CO., LTD., Inagi-shi, Tokyo (JP)

( * ) Notice: Subject to any disclaimer, the term of this patent is extended or adjusted under 35 U.S.C. 154(b) by 635 days.

(21) Appl. No.: 14/907,133

(22) PCT Filed: Jun. 3, 2014

(86) PCT No.: PCT/JP2014/064697
§ 371 (c)(1),
(2) Date: Jan. 22, 2016

(87) PCT Pub. No.: WO2015/011992
PCT Pub. Date: Jan. 29, 2015

(65) Prior Publication Data
US 2016/0168765 A1    Jun. 16, 2016

(30) Foreign Application Priority Data

Jul. 23, 2013 (JP) .................................. 2013-152184

(51) Int. Cl.
*D03D 15/02*    (2006.01)
*D21F 1/00*    (2006.01)
(Continued)

(52) U.S. Cl.
CPC .............. *D03D 15/02* (2013.01); *B32B 1/00* (2013.01); *B32B 5/024* (2013.01); *B32B 5/26* (2013.01);
(Continued)

(58) Field of Classification Search
CPC ........ D03D 15/02; D03D 1/094; D03D 11/00; D21F 1/0054; B32B 1/00; B32B 5/024;
(Continued)

(56) References Cited

U.S. PATENT DOCUMENTS 6,223,781 B1    5/2001   Yamada et al.
8,899,276 B2    12/2014  Takahashi et al.
2013/0206276 A1  8/2013  Takahashi et al.

FOREIGN PATENT DOCUMENTS

JP    57-106797 U    7/1982
JP    59-017798 U    2/1984
(Continued)

OTHER PUBLICATIONS

Notification of Receipt of Search Copy issued in Application No. PCT/JP2014/064697, dated Jun. 17, 2014 (1 page).
(Continued)

*Primary Examiner* — Cephia D Toomer
(74) *Attorney, Agent, or Firm* — Michael Best & Friedrich LLP

(57) ABSTRACT

A binding structure of an industrial fabric for binding both ends of a fabric with ends to form it into an endless type has loops formed by bending a portion or all ends of warp constituting the fabric at both ends and folding it back, the loop at the one end constitutes a binding loop which forms a common hole into which a core wire is introduced upon binding, the loop at the other end portion which is opposed to the binding loop to form a pair with the binding loop upon binding has a structure into which the binding loop is fitted and against which the binding loop is locked, and forms a loop hole into which the core wire is not introduced.

9 Claims, 3 Drawing Sheets

(51) Int. Cl.
  *B32B 1/00* (2006.01)
  *B32B 5/02* (2006.01)
  *B32B 5/26* (2006.01)
  *D03D 1/00* (2006.01)
  *D03D 11/00* (2006.01)

(52) U.S. Cl.
  CPC ............ *D03D 1/0094* (2013.01); *D03D 11/00* (2013.01); *D21F 1/0054* (2013.01); *B32B 2250/20* (2013.01); *B32B 2262/0284* (2013.01); *B32B 2413/00* (2013.01); *D10B 2331/04* (2013.01); *D10B 2505/00* (2013.01)

(58) Field of Classification Search
  CPC ........ B32B 2250/20; B32B 2262/0284; B32B 2413/00; D10B 2231/04; D10B 2505/00
  See application file for complete search history.

(56) References Cited

FOREIGN PATENT DOCUMENTS

| JP | 2000290855 | * | 4/1999 |
| JP | 3938817 B2 | | 6/2007 |
| JP | 2013-036157 A | | 2/2013 |

OTHER PUBLICATIONS

International Search Report with English translation issued in Application No. PCT/JP2014/064697, dated Sep. 2, 2014 (4 pages).
Written Opinion of International Searching Authority issued in Application No. PCT/JP2014/064697, dated Sep. 2, 2014 (3 pages).

* cited by examiner

BINDING STRUCTURE OF INDUSTRIAL FABRIC

TECHNICAL FIELD OF THE INVENTION

The present invention relates to a binding structure of an industrial fabric in an endless form such as a fabric for making papers, a fabric for manufacturing unwoven fabric, a fabric for dehydrating or squeezing sludge, a belt for manufacturing a building member, and conveyor belt, etc., in particular, relates to the a binding structure of an industrial fabric which is capable of stably and simply mounting the industrial fabric with ends on a machine and processing it into the fabric in an endless form to enable a time period for such a process to be shortened by forming a binding loop and the corresponding loop hole. In addition, the present invention relates to a binding structure of an industrial fabric which is capable of making a net thickness at a loop forming portion substantially same as that of an ordinary portion by preventing the loop forming portion of the fabric whose an upper surface side fabric is formed by yarns made of fluorine resin, from being exposed on the surface of a lower surface side warp.

BACKGROUND ART

Conventionally, many kinds of industrial fabrics such as a fabric for making papers, a fabric for unwoven fabric, a fabric for hydrating sludge, a belt for manufacturing building material, a conveyor belt have been widely known. Each of these industrial fabrics has been formed in an endless form to be used with being mounted on machines such as a paper making machine, a hydrator.

Here, with respect to a method of processing these industrial fabrics in endless forms, so-called weave-patch method, a method in which loops formed using warps of the industrial fabrics are mated, at both ends, and then, a core wire for binding is penetrated into a common hole formed by the loops, a method in which spiral loops arranged at both ends of the fabric are mated with each other, and then, the core wire is introduced into these spiral loops, and a method in which metal hooks mounted on both ends of the fabric called clipper ratings are mated with each other, and then, the core wire is introduced into these metal hooks haven been widely known. These many methods have been adopted in accordance with applications.

Among these methods, it is technical possible to desirably form in either an endless form, or an end form by inserting into the core wire of binding, or removing the core wire, in the method in which the loops formed at the ends of the industrial fabric are mated with each other to form an endless form. If the fabric can desirably be formed in either an endless form, or an end form, when the fabric is mounted on a machine, the end of the fabric can be wound between rolls of the machine, and then, the fabric can be formed in an endless form with being wound around the machine.

For instance, the machine can be operated after an old-used industrial fabric is formed to possess ends with being mounted on the machine, and then, one end of a new industrial fabric to be mounted is bound to one of the ends. This causes the industrial fabric to shift between the rolls of the machine to be wound between the rolls, whereby the old-used industrial fabric can be removed and the new industrial fabric can be formed in an endless form to be mounted on the machine after the fabric is wound around in an entire form.

On the other hand, in case of the weave-patch method in which it is not feasible to desirably form either the endless type or the type in which ends are included, a so-called cantilever method in which the roll of the machine is supported at one side, while a poll etc. hinders the insertion of the industrial fabric, at the other side is removed, and then, the industrial fabric is introduced form the one side of the machine in the widthwise direction to be wound around has to be adopted. However, in order to effect weave-patch by the cantilever method, a specific structure for detaching the fabric is essential for the machine itself, a defect that the cost for manufacturing the machine is raised. In addition, another defect that the machine becomes bulky, or that a wide space for arranging the machine can be caused. Further, in a case where the heavy or long industrial fabric is used, it is technically difficult to introduce the fabric, and thus, it is not suitable.

Such being the case, such a cantilever method has not been adopted in fact except for the fabric for making web used at the web-making section of the paper making machine where the surface smoothness is extremely important. Therefore, a method in which spiral loops or metal hooks are formed at end portions has been adopted as a method of forming the fabric in an endless form.

However, in the above method, additional spiral wires or metal hooks which has a different structure or material form the yarns constituting the industrial fabric has to be mounted. In addition, in a case where the loop is formed, the loop forming portion and the ordinary portion are different from each other and the loop protrudes from the end portion, so that the structure of the binding portion is fundamentally different from the ordinary portion.

In view of the above technical problems, a binding loop structure for the industrial fabric has been proposed in the Patent Publications 1 and 2. In the binding loop structure for the industrial fabric, the warp constituting the fabric is folded back at the end portion to form a plurality of binding loops, and then, such a plurality of binding loops are aligned with each other to form a hole, followed by the fact that the core wire is introduced into such a hole. FIG. 6 is a plain photograph showing an example of the conventional binding structure of the industrial fabric. As shown in FIG. 6, the core wire is introduced into the common hole formed by the loops.

However, in the above binding loop structure of the industrial fabric, additional process in which a plurality of bonding loops are aligned with each other, and then holes which are formed by the loops and through which the core wire is penetrated have to be arranged before the fabric is processed in an endless form. In such a case, it becomes impossible to smoothly carry out the insertion of the core wire into the holes unless any one of the holes of the loops gets offset. In addition, if the core wire is introduced into the loops any one of which is loose, the boding loop can protrude toward the upper layer, or a gap can be caused. Such problems can bring about a serious problems such as a marking or a decrease of the rigidity.

That is why a highly-skilled technique and much time are essential for the process for making a plurality of binding loops aligned with each other and arranging the holes into which the core wire is introduced, so that the degree of the technical difficulty for the method of processing the endless form, whereby it takes a lot of time for the boding operation.

In addition, in the industrial multi-layered fabric, since the binding loop formed by the upper surface side warp and the binding loop formed by the lower surface side warp are overlapped with each other at the loop forming portion, the net thickness of the fabric is thicker than that of the ordinary portion. Such a problem has not been solved by the so far binding structure of the industrial fabric.

Further, in some of the present industrial fabrics, the upper surface side fabric is constituted by yarns made of fluorine resin in order to deal with the dirt problem, while the lower surface side fabric is constituted by yarns made of polyethylene terephthalate (PET) in order to fulfill the required physical properties such as rigidity.

If the method of forming loops is applied to the binding structure of the both end portions of such industrial fabrics, the technical problem that the loop forming portion and the ordinary portion have different structure from each other is raised. More specifically, loop portions are formed at the lower surface side warp in addition to the upper surface side warp in order to increase the strength of the loop forming portions, so that the lower surface side warp formed of PET, etc. becomes exposed to the surface, whereby the anti-dirt effect at the binding portion becomes deteriorated.

On the other hand, as disclosed by the binding portion in Patent Publication 2, the binding loop structure positively concealing the loop forming portion by the upper surface side weft is known. However, the invention of the binding loop described in Patent Publication 2 does not pay attention to the fact that the loop forming portion is kept not exposed to the surface of the lower surface side fabric.

PATENT PUBLICATIONS

Patent Publication 1: Japanese Patent Laid-open Publication 2013-36157
Patent Publication 2: Japanese Patent Publication No. 3938817

DISCLOSURE OF THE INVENTION

Technical Problems to be Solved by Present Invention

An object of the present invention is to provide a binding loop structure of an industrial fabric which is capable of stably and readily carrying out an operation for mounting the industrial fabric with ends on a machine to process it to form an endless type without a need of highly-skilled technique, and thus, shortening a time for such an operation, as compared with a conventional binding operation.

Another object of the present invention is to provide a binding loop structure of an industrial fabric which is capable of preventing the dirt on the surface of the fabric at the binding portion without decreasing the binding strength, in a case where the upper surface side warp is formed by yarns with anti-dirt function such as fluorine resin.

Means to Solve Technical Problems

In order to solve the above technical problems, the present invention includes the following structure.

In one embodiment, a binding structure of an industrial fabric for binding both ends of a fabric with ends to form it into an endless type comprises loops formed by bending a portion or all ends of warp constituting the fabric at both ends and folding it back, the loop at the one end constitutes a binding loop which forms a common hole into which a core wire is introduced upon binding, the loop at the other end portion which is opposed to the binding loop to form a pair with said binding loop upon binding comprises a structure into which said binding loop is fitted and against which said binding loop is locked, and forms a loop hole into which the core wire is not introduced.

In some embodiments, said binding loop is formed by a loop which is bent toward a vertical direction, said loop hole is formed by a loop which is bent toward a horizontal direction and locked against the core wire upon the binding.

In some embodiments, said binding loop and said loop hole are arranged in an alternate manner, at said one end portion.

In some embodiments, said industrial fabric comprises a structure in which the warps and the wefts are arranged in a multi-layered configuration, the loop formed by the upper surface side warp at the one end constitutes the binding loop which includes the common hole into which the core wire is introduced upon binding, the loop formed by the upper surface side warp at the other end which is opposed to the binding loop to form a pair with the binding loop constitutes the loop hole into which the binding loop is fitted and against which binding loop is locked and into which the core wire it not introduced, the loop formed by the lower surface side warp at the other end constitutes the binding loop which includes the common hole into which the core wire is introduced upon binding, the loop formed by the lower surface side warp at the one end which is opposed to the binding loop to form a pair with the binding loop constitutes the loop hole into which the binding loop is fitted and against which binding loop is locked and into which the core wire it not introduced.

In some embodiments, each of all the ends portion of the upper surface side warps at said one end portion constitute the loop hole, while each of all the ends portion of the lower surface side warps at said the other end portion constitute the bonding loop hole, and each of all the ends portion of the lower surface side warps at said the other end portion constitute the loop hole.

In some embodiments, said industrial fabric constitutes a two-layered fabric consisting of said upper surface side warps, said lower surface side warps, said upper surface side wefts, said lower surface side wefts, a weft binding yarns, and auxiliary wefts.

In some embodiments, said upper surface side warps are made of fluorine resin, while the lower surface side warps are made of material different from that of said upper surface side warps.

Effect of the Invention

According to the binding loop of the industrial fabric of the present invention, the operation in which the industrial fabric with ends is mounted on the machine to be formed into an endless form can be stably and simply carried out without a need of a high-skilled technique, as compared with a conventional binding process, so that a time for the operation can be largely shortened.

In addition, by adopting the binding loop of the industrial fabric of the present invention, in a case where the upper surface side warp is formed by yarns including anti-dirt function such as fluorine resin, the dirt on the surface of the fabric at the binding portion can be prevented without decreasing the binding strength.

BRIEF EXPLANATION OF DRAWINGS

FIG. 1(*a*) shows the binding loop and the loop hole before binding. FIG. 1(*b*) is a partial perspective view showing an example of a binding structure of the second embodiment according to the present invention.

FIG. 4(*a*) shows the entire binding structure, FIG. 4(*b*) shows the binding loop formed by the upper surface side warps, FIG. 4(*c*) shows the binding loop formed by the lower surface side warps, FIG. 4(*d*) shows the binding loop hole at the other end portion formed by the upper surface side warps, and FIG. 4(*e*) shows the loop hole at the other end portion formed by the lower surface side warps.

Figure 1:
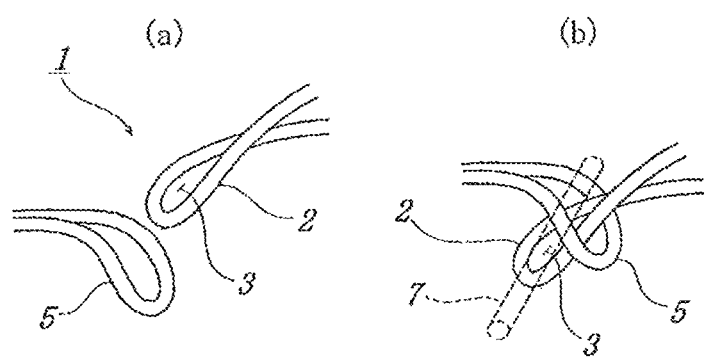
FIG. 1 is a partial perspective view showing an example of a binding structure of the first embodiment according to the present invention.

Now, the structure and the effect of the binding structure of the industrial fabric of the present invention will be described below. Embodiments of the industrial fabric of the present invention will be described thereafter with reference to the drawings.

In the binding structure of the industrial fabric of the present invention, loops are formed by bending a portion or all ends of warp constituting the fabric at both ends and folding it back, the loop at the one end constitutes a binding loop which forms a common hole into which a core wire is introduced upon binding, the loop at the other end portion which is opposed to the binding loop to form a pair with said binding loop upon binding comprises a structure into which said binding loop is fitted and against which said binding loop is locked, and forms a loop hole into which the core wire is not introduced.

Here, the binding loop is defined to be one or more holes which are aligned with each other in the direction in which the machine for manufacturing the fabric is run and into which the core wire are introduced, in a case where the fabric with ends is processed to be an endless form.

More specifically, the binding loop is the one forming the common hole into which the core wire is introduced, and it is not the warp merely folded back for pressing the weft at the end portion. The binding loop may be preferably bent so as to form the loop in the substantially vertical direction in advance, since the core wire can be readily introduced into the loop.

In addition, the binding loop may be formed by bending the end portion of the warp of the fabric to fold it back, and weaving the folded back end portion of the warp with the plurality of wefts. In other words, the folded back warp forming the loop normally is woven with the adjacent warps of the ordinary portion (a portion of the fabric which is not the bending portion), so that it is abutted against the adjacent warps which are cut at a suitable portion of the ordinary portion. The folded back warp forming the loop may be woven with the warp portions which are spaced apart from each other, or it may be woven between the two adjacent warps. In addition, in a case where the warp which does not form the binding loop or the loop hole is included, such a warp may be woven after it is folded back to form a lock. In this connection, in case of the warp which does not form the loop, it may be simply cut at the intermediate portion, or the end portion of the ordinary portion, instead of being folded back.

Further, the loop hole is the loop into which the core wire is not introduced, unlike the binding loop. The loop hole is also one or more loops which are aligned with each other in the machine direction, like the binding loop, but, it is arranged to be opposed to the binding loop to form a pair with the binding loop upon binding and is formed by the warp at the other end portion. The loop hole may be formed by bending the end portion of the warp at the other end. portion and folding it back to weave the end portion of the folded back warp with the plurality of wefts.

Such a loop hole includes a structure into which the binding loop is fitted and against which the binding loop is locked. The shape of each of the binding loop and the loop hole can by any, so long as the binding loop can be fitted into the loop hole. For instance, the binding loop may be the loop bent in the substantially vertical direction, while the loop hole may be the loop bent in the substantially horizontal direction. In addition, the loop hole may be preferably the structure which locks against the core wire upon binding.

By adopting the above binding structure, since the binding loop into which the core wire is introduced is fitted into one or more loop holes aligned with each other in the machine direction, and thus, fixed, a plurality of binding loops do not have to be aligned with each other, in a case where the fabric is formed into an endless type. Such being the case, the deviation of the position of the common hole of the binding loop can be largely restricted, whereby the process in which the industrial fabric with ends is mounted on the machine to be formed into the one in an endless type can be stably and simply carried out without a need of the highly skilled technique. Accordingly, a time required for processing the endless type can be largely shortened.

In addition, in the binding structure of the industrial fabric of the present invention, all the end portions of the warp at the one end portion may constitute the binding loops. Further, all the end portions of the warp at the other end portion may constitute the loop holes. Needless to say, a portion of the warp at the one end portion may constitute the binding loop or the loop hole, and. in case of the warp which does not form the loop, it may be simply cut at the intermediate portion, or the end portion of the ordinary portion, instead of being folded back.

In the binding structure of the industrial fabric of the present invention, a structure in which the warps and the wefts are arranged in a multi-layered configuration, for binding both ends of a fabric with ends to form it into an endless type comprises loops formed by bending a portion or all ends of warp constituting the fabric at both ends and folding it back, the loop at the one end constitutes a binding loop which forms a common hole into which a core wire is introduced upon binding, the loop at the other end portion which is opposed to the binding loop to form a pair with said binding loop upon binding comprises a structure into which said binding loop is fitted and against which said binding loop is locked, and forms a loop hole into which the core wire is not introduced.

In particular, the loop formed by the upper surface side warp at the one end constitutes the binding loop which includes the common hole into which the core wire is introduced upon binding, the loop formed by the upper surface side warp at the other end which is opposed to the binding loop to form a pair with the binding loop constitutes the loop hole into which the binding loop is fitted and against which binding loop is locked and into which the core wire it not introduced, the loop formed by the lower surface side warp at the other end constitutes the binding loop which includes the common hole into which the core wire is introduced upon binding, the loop formed by the lower surface side warp at the one end which is opposed to the binding loop to form a pair with the binding loop constitutes the loop hole into which the binding loop is fitted and against which binding loop is locked and into which the core wire it not introduced.

In addition, the number of positions at each of which the binding holes are aligned with each other in order for the two core wires to be introduced thereinto may be two. In such an arrangement, it is preferable that the binding loop formed by the upper surface side warp and the loop hole formed by the lower surface side warp may be arranged in an alternate manner, at the end portion of the upper surface side warp at the one end portion, while, the binding loop formed by the lower surface side warp and the loop hole formed by the upper surface side warp may be arranged in an alternate manner, at the other end portion.

The material of the yarns other than fluorine resin used for the wefts of the industrial fabric of the present invention can be freely selected in accordance with the characteristics desired for the industrial fabric, and is not limited to the specific material.

The configuration of the yarn includes, in addition to monofilaments, multifilaments, spun yarns, finished yarns subjected to crimping or bulking such as so-called textured yarn, bulky yarn and stretch yarn, taslan yarns, mole yarns, and yarns obtained by intertwining them. As the cross-section of the yarn, not only circular form but also square or short form such as stellar form, or elliptical or hollow form can be used. The material of the yarn can be selected freely and usable examples of it include polyester, polyamide, polyphenylene sulfide, polyvinylidene fluoride, polypropylene, aramid, polyether ketone, polyethylene naphthalate, cotton, wool and metal. Of course, yarns obtained using copolymers or incorporating or mixing the above-described material with a substance selected depending on the intended purpose may be used.

In particular, in a case where spun yarns, processed yarns such as crimping or bulking, or the flexible yarns with a large diameter such as mole yarn, for the upper layer weft is used, the upper layer surface tends to be covered by theses yarns, so that the difference of the appearance between the bonding portion and the ordinary portion can be hardly distinguished from each other, from the upper layer side.

The material of the yarns other than fluorine resin used for the wefts of the industrial fabric of the present invention can be freely selected in accordance with the characteristics desired for the industrial fabric, and is not limited to the specific material.

The configuration of the yarn includes, in addition to monofilaments, multifilaments, spun yarns, finished yarns subjected to crimping or bulking such as so-called textured yarn, bulky yarn and stretch yarn, and yarns obtained by intertwining them. As the cross-section of the yarn, not only circular form but also square or short form such as stellar form, or elliptical or hollow form can be used. The material of the yarn can be selected freely and usable examples of it include polyester, polyamide, polyphenylene sulfide, polyvinylidene fluoride, polypropylene, aramid, polyether ketone, polyethylene naphthalate, polytetrafluoroethylene, cotton, wool and metal. Of course, yarns obtained using copolymers or incorporating or mixing the above-described material with a substance selected depending on the intended purpose may be used.

Since the yarn constituting the fabric for unwoven fabric generally includes a high rigidity, polyester monofilaments with excellent dimension stability may be preferably adopted.

In addition, in the binding structure of the present invention, the upper surface side warp may be formed by fluorine resin. In such a case, in addition to the upper surface side warp constituting the upper surface side fabric, the upper surface side weft and the upper surface side floating yarn, the core wire into which the upper surface side binding loop also may be made of fluorine resin. The fluorine resin which is material for the upper surface side warps and the upper surface side wefts of the fabric of the present invention may be preferably composite resin containing fluorine with high anti-dirt. For instance, at least one material can be selected from a group of polytetrafluoroethylene (PTFE), copolymer of tetrafluoroethylene and hexafluoropropylene (FEP), copolymer of tetrafluoroethylene and fluoro vinyl ether (PFA), polyvinylidene fluoride (PVDF), copolymer of ethylene and tetrafluoroethylene (ETFE), and copolymer of ethylene and chlorotrifluoroethylene (ECTFE). In particular, ETFE is suitable for the anti-dirt characteristics and cost.

In this connection, it is preferable to impregnate silicon resin in the fluorine resin material (water dispersion) in order to improve the flexibility. In addition, the color of the surface of the fabric can be freely changed by adding various kinds of pigment to the fluorine resin material (water dispersion).

In addition, one-layered warp-one-layered weft structure, one-layered warp-two-layered wefts structure, one-layered warp-three-layered wefts structure may be adopted as the structure of the fabric of the present invention.

Further, in the industrial fabric of the present invention adopting fluorine resin, two layered fabric in which the upper surface side fabric and the lower surface side fabric are bound by the weft binding yarns may be preferable. For instance, in a case where the upper surface side fabric is made of fluorine resin, the binding yarn may be formed by yarns made of PET, etc. the rigidity of which is higher than that of fluorine resin. Inner binding in which the binding yarns are not exposed to the surface can be effected by making the binding yarn the weft binding yarn. More specifically, the yarn made of PET, etc. can be prevented from being exposed on the surface of the upper surface side fabric formed only by fluorine resin, which bring about the beneficial effect.

DETAILED DESCRIPTION OF THE INVENTION

Now the binding structure of the industrial fabric of the present invention will be described below. Embodiments of the binding structure of the industrial fabric of the present invention will be described thereafter with reference to the drawings.

Embodiment 1

Now, the embodiments of the present invention will be described below with reference to the drawings. FIG. 1 is a partial perspective view showing an example of a binding structure of the first embodiment according to the present invention. In the binding structure 1 of the industrial fabric of the present invention, loops are formed by bending the warps constituting the fabric at the both ends and thus, folding them back. As shown in FIG. 1(a), the binding structure 1 of the industrial fabric of the present invention is constituted by the binding loop 2 forming the common hole 3 into which the core wire is introduced upon the binding and the loop hole 5 opposite to the binding loop 2.

As shown in FIG. 1(b), the loop hole 5 has a structure into which the binding loop 2 is fitted and against which the binding loop 2 is locked. The binding loop 2 includes the common hole 3 into which the core wire (not shown) is introduced, while the loop hole 5 has a structure into which the binding loop 2 is fitted without the core wire being introduced thereinto. Such being the case, the position of the common hole 3 of the binding loop 2 can be fixed by fitting the binding loop 2 into the loop hole 5 at the opposed other end portion of the fabric.

Figure 2:
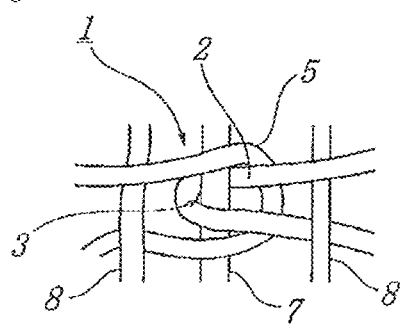
FIG. 2 is a partial plain view showing an example of a binding structure of the first embodiment according to the present invention.

FIG. 2 is a partial plain view showing an example of a binding structure of the first embodiment according to the present invention. As shown in FIG. 2, loops are formed by bending the warps 2, 5 constituting the fabric to fold them back at the both ends. The one end of the loop is the binding loop 2 forming the common hole 3 into which the core wire is introduced upon the binding, while the other end of the loop forming a pair with the opposed binding loop 2 upon the binding is the loop hole 5 into which the binding loop is fitted and against which the binding loop is locked. The industrial fabric with ends can be processed into the one in an endless form by introducing the core wire 7 into the common hole 3 after the binding loop 2 is fitted into the loop hole 5 at the opposed other end of the fabric. In the manufacturing structure of the industrial fabric of the first embodiment, as shown in FIG. 2, the loop hole 5 is locked against the core wire 7 from above. In addition, as shown in FIG. 2, in the binding structure of the first embodiment according to the present invention, the binding loop 2 is the one which is bent in the substantially vertical direction, while the loop hole 5 is the one which is bent in the substantially horizontal direction.

In this connection, in FIG. 2, the reference number 8 is the weft. The end of each of the warps 2, 5 of the fabric is bent to be folded back, so that the fabric is formed by weaving the plurality of wefts 8,8 with folded back end portions of the warps.

By adopting such a binding structure, since the binding loop 2 into which the core wire is introduced is fitted into one or more loop holes 5 aligned with each other in the machine direction, the deviation of the position of the common hole of the binding loop 2 can be largely restricted, whereby the process in which the industrial fabric with ends is mounted on the machine to be formed into the one in an endless type can be stably and simply carried out without a need of the highly-skilled technique. Accordingly, a time required for processing the endless type can be largely shortened.

Figure 3:
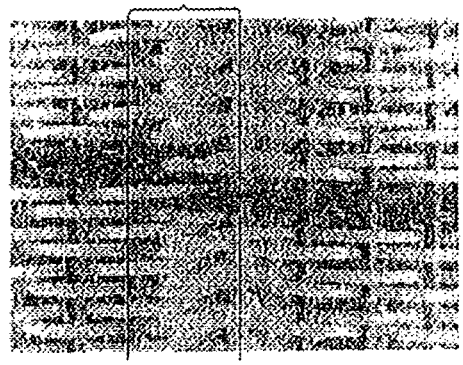
FIG. 3 is a partial plain photograph showing an example of a binding structure of the first embodiment according to the present invention.

FIG. 3 is a partial plain photograph showing an example of a binding structure of the first embodiment according to the present invention.

The loop biding portion in FIG. 3 includes the binding structure of the industrial fabric of the first embodiment.

Figure 6:
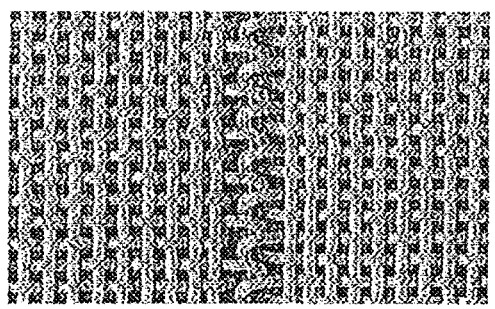
FIG. 6 is a partial plain photograph showing a binding loop structure of the conventional industrial fabric.

By adopting such a manufacturing structure as shown in FIG. 3, the process in which the industrial fabric with ends is mounted on the machine to be formed into the one in an endless type can be stably and simply carried out without a need of the highly-skilled technique, as compare with the conventional binding structure as shown in FIG. 6. Accordingly, a time required for processing the endless type can be largely shortened. In addition, as readily seen from FIG. 3, in the industrial fabric of the first embodiment of the present invention, the marking at the binding portions of the fabric can be largely decrease, as compared with the conventional type, since a gap shown in FIG. 6 can be decreased by making the both ends close to each other.

Embodiment 2

Figure 4:
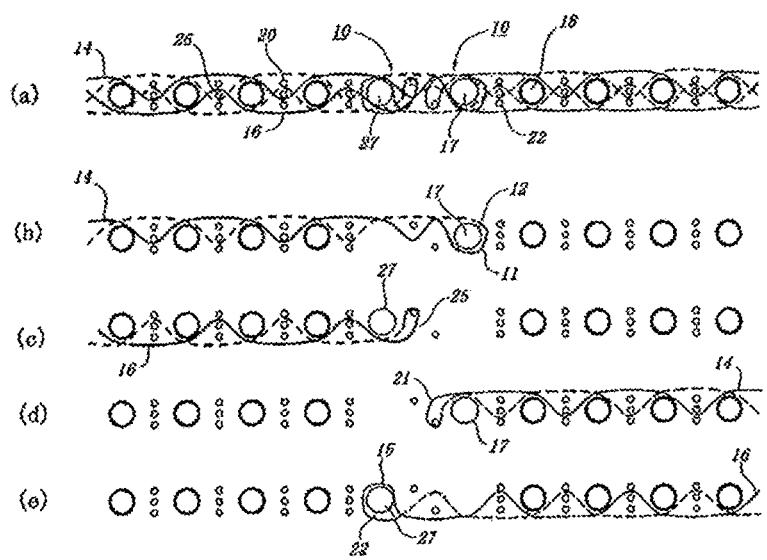
FIG. 4 is a cross sectional view showing an example of a binding structure at the both ends of the fabric of the second embodiment according to the present invention.

FIG. 4 is a cross sectional view showing an example of a binding structure 10 at the both ends of the fabric of the second embodiment according to the present invention. FIG. 4(a) shows the entire binding structure 10, FIG. 4(b) shows the binding loop 11 formed by the upper surface side warps 14, FIG. 4(c) shows the loop hole 25 formed by the lower surface side warps 16, FIG. 4(d) shows the binding loop hole 21 at the other end portion formed by the upper surface side warps 14, and FIG. 4(e) shows the binding loop 15 at the other end portion formed by the lower surface side warps 16.

The binding structure 10 of the industrial fabric of the present invention is formed by weaving the upper surface side warp 14 and the lower surface side warp 16 with the weft 18, the upper surface side auxiliary weft 20, the lower surface side auxiliary weft 22 and the weft binding yarn 26. Each of the structure of the warp is as follows. As shown in FIG. 4(b), the loop formed by the upper surface side warp 14 at the one end portion is the binding loop 11 including the common hole 12 into which the core wire 17 is introduced upon binding. The upper surface side warp 14 is made of fluorine resin.

In addition, As shown in FIG. 4(d), the loop at the other end portion which is opposed to the binding loop 11 and forms a pair with the binding loop 11 upon binding and is formed by the upper surface side warp 14 is the loop hole 21 which includes a structure into which the binding loop 11 is fitted to lock against the binding loop 11. The core wire 17 is not introduced into the loop hole 21.

In addition, as shown in FIG. 4 (e), the loop formed by the lower surface side warp 16 at the other end portion is the binding loop 15 including the common hole 22 into which the core wire 27 is introduced upon binding. As shown in FIG. 4(c), the loop which is opposed to the binding loop 15 and form a pair with the binding loop 15 and is formed by the upper surface side warp 16 at the one end portion is the loop hole 25 including a structure into which the binding loop 15 is fitted and against which the binding loop 15 is locked. The core wire 27 is not introduced into the loop hole 25. The lower surface side warp 16 is made of polyester with excellent rigidity. Such being the case, the positions of the common holes 12, 22 of the binding loops 11,15 can be fixed by fitting the binding loops 11,15 into the loop holes 21,25 at the opposed other ends portions, whereby the process of introducing the core wires 17,27 can be simplified.

Figure 5:
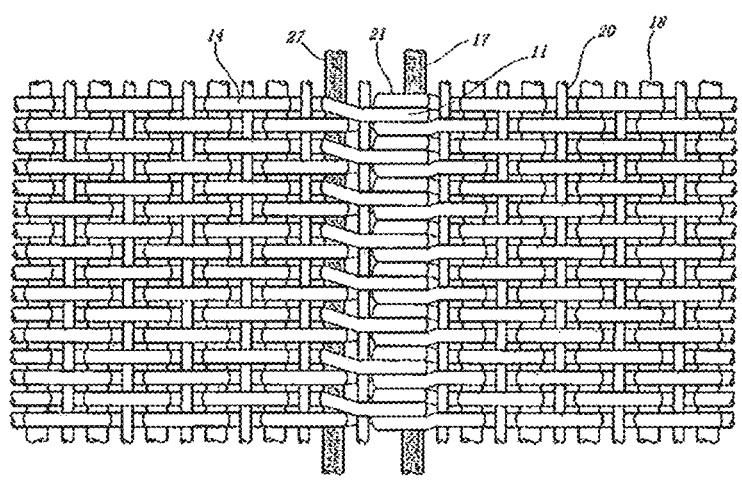
FIG. 5 is a plain showing a surface side of a binding structure of the second embodiment according to the present invention.

FIG. 5 is a plain showing a surface side of a binding structure of the second embodiment according to the present invention. The loop binding portion as shown in FIG. 5 includes the binding structure of the industrial fabric of the second embodiment.

As shown in FIG. 5, in the binding structure of the industrial fabric of the present invention, the loop formed by the upper surface side warp 14 at the one end portion is the biding loop 11 including the common hole into which the core wire 27 is introduced upon binding. The upper surface side warp 14 is made of fluorine resin.

In addition, the loop which is opposed to the binding loop 11 and form a pair with the binding loop 11 upon binding and is formed by the upper surface side warp 14 at the other end portion is the loop hole 21 including a structure into which the binding loop 11 is fitted and against which the binding loop 11 is locked. The core wire is not introduced into the loop hole 21. Since the structure of the lower surface side warp is not clearly seen in FIG. 5 which is a plain view, but, the structure of the lower surface side warp is formed by the above explanation about FIG. 4(c) and (e). In other words, the binding structure into which the core wire 72 is introduced is formed. The lower surface side warp is made of polyester with excellent rigidity.

By adopting such a binding structure as shown in FIG. 5, the process in which the industrial fabric with ends is mounted on the machine to be formed into the one in an endless type can be stably and simply carried out without a need of the highly-skilled technique, as compare with the conventional binding structure as shown in FIG. 6. Accordingly, a time required for processing the endless type can be largely shortened.

In addition, as readily seen from FIG. 5, in the industrial fabric of the first embodiment of the present invention, the marking at the binding portions of the fabric can be largely decrease, as compared with the conventional type, since a gap shown in FIG. 6 can be decreased by making the both ends close to each other.

Further, by adopting such a binding structure of the second embodiment, since the upper surface side warp is formed by yarns made of fluorine resin with anti-dirt function, while the lower surface side warp is formed by yarns made of polyester with excellent rigidity, the dirt on the surface of the fabric at the binding portion can be prevented without decreasing the binding strength.

EXPLANATION OF SYMBOLS 1, 10: binding structure of the embodiments
2, 11, 21: binding loop forming common hole into which core wire is introduced upon binding
3, 12, 22: common hole
5, 16, 18: loop hole opposed to binding loop to form a pair upon binding
7: core wire
8: weft
20: upper surface side auxiliary weft
22: lower surface side auxiliary weft
26: weft binding yarn

What is claimed is:

1. A binding structure of an industrial fabric for binding both ends of a fabric with ends to form it into an endless type, the industrial fabric including a plurality of warps and a plurality of wefts, the binding structure comprising:
   binding loops, each of the binding loops formed by bending an end of one of the warps and folding it back;
   receiving loops opposed to the binding loops, each of the receiving loops associated with and configured to receive a respective one of the binding loops therethrough; and
   a core member extending through each binding loop and locking the binding loop against the associated receiving loop without passing through any of the receiving loops.

2. The binding structure of an industrial fabric according to claim 1, wherein each binding loop is formed by a loop that is bent toward a vertical direction, each receiving loop formed by a loop that is bent toward a horizontal direction and locked against the core member upon the binding.

3. The binding structure of an industrial fabric according to claim 1, wherein the binding loops and the receiving loops are arranged in an alternate manner along one end portion of the fabric.

4. The binding structure of an industrial fabric according to claim 1, wherein the industrial fabric comprises a structure in which the warps and the wefts are arranged in a multi-layered configuration that includes upper surface side warps and lower surface side warps,
   wherein the binding loops include first binding loops and second binding loops, each of the first binding loops is formed by bending an end of one of the upper surface side warps and folding it back, each of the second binding loops is formed by bending an end of one of the lower surface side warps and folding it back;
   the receiving loops include first receiving loops and second receiving loops, each of the first receiving loops is associated with and configured to receive a respective one of the first binding loops therethrough, each of the second receiving loops associated with and configured to receive a respective one of the second binding loops therethrough; and
   the core member is a first core member extending through each first binding loop and locking each first binding loop against the associated first receiving loop without passing through any of the first receiving loops, a second core member extending through each second binding loop and locking each second binding loop against the associated second receiving loop without passing through any of the second receiving loops.

5. The binding structure of an industrial fabric according to claim 4, wherein each first binding loop is formed by a loop that is bent toward a vertical direction, each first receiving loop formed by a loop that is bent toward a horizontal direction and locked against the first core member upon the binding.

6. The binding structure of an industrial fabric according to claim 5, wherein each second binding loop is formed by a loop that is bent toward a vertical direction, each second receiving loop formed by a loop that is bent toward a horizontal direction and locked against the second core member upon the binding.

7. The binding structure of an industrial fabric according to claim 4, wherein each second binding loop is formed by a loop that is bent toward a vertical direction, each second receiving loop formed by a loop that is bent toward a horizontal direction and locked against the second core member upon the binding.

8. The binding structure of an industrial fabric according to claim 4, wherein said industrial fabric constitutes a two-layered fabric consisting of a plurality of upper surface side warps, a plurality of lower surface side warps, a plurality of upper surface side wefts, a plurality of lower surface side wefts, weft binding yarns, and auxiliary wefts.

9. The binding structure of an industrial fabric according to claim 4, wherein upper surface side warps are made of fluorine resin, while lower surface side warps are made of material different from that of said upper surface side warps.

* * * * *